United States Patent
Naka

(10) Patent No.: US 9,216,601 B2
(45) Date of Patent: Dec. 22, 2015

(54) ELECTRIC DEVICE AND PRINTING APPARATUS USING THE SAME

(71) Applicant: CANON KABUSHIKI KAISHA, Tokyo (JP)

(72) Inventor: Hironori Naka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 169 days.

(21) Appl. No.: 13/910,756

(22) Filed: Jun. 5, 2013

(65) Prior Publication Data

US 2014/0002517 A1   Jan. 2, 2014

(30) Foreign Application Priority Data

Jun. 29, 2012   (JP) ................................. 2012-147599
Jun. 29, 2012   (JP) ................................. 2012-147600

(51) Int. Cl.
*B41J 29/38* (2006.01)
*B41J 2/45* (2006.01)
*G06K 15/00* (2006.01)

(52) U.S. Cl.
CPC .. *B41J 29/38* (2013.01); *B41J 2/45* (2013.01); *G06K 15/005* (2013.01)

(58) Field of Classification Search
USPC .............................. 347/5, 9, 12, 15; 345/168
See application file for complete search history.

(56) References Cited

U.S. PATENT DOCUMENTS 8,031,179 B2   10/2011   Naoi et al.

FOREIGN PATENT DOCUMENTS

JP   2000-207110 A   7/2000
JP   2008-33915 A   2/2008

*Primary Examiner* — Lam Nguyen
(74) *Attorney, Agent, or Firm* — Fitzpatrick, Cella, Harper & Scinto

(57) ABSTRACT

An embodiment of this invention relates to an electric device capable of controlling a plurality of elements with an inexpensive, simple configuration, and a printing apparatus using the same. In this embodiment, an operation unit of the printing apparatus switches the states of a plurality of general purpose input/output ports between low-level signal output, high-level signal output, and input high impedance for each time set in a timer by an MPU. This allows LED light emission control and switch key press detection. Also, output ports used for LED light emission control, and input ports used for key press detection are shared using general purpose input/output ports to realize LED light emission control and switch key press detection with a configuration simpler than the conventional configuration.

9 Claims, 21 Drawing Sheets

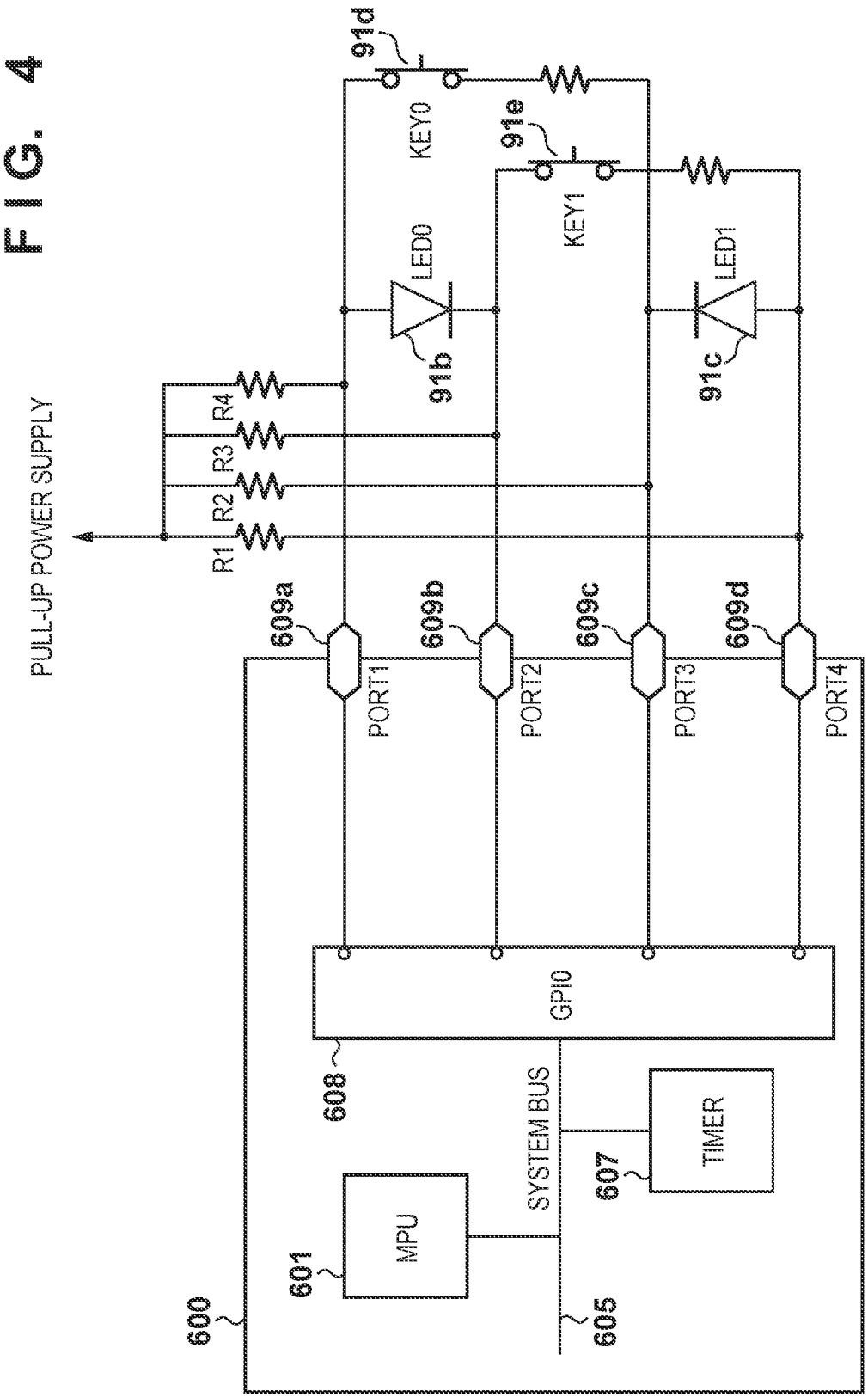

FIG. 5A

|  | state1 | state2 |
|---|---|---|
| GENERAL PURPOSE INPUT/OUTPUT PORT 1 | 0 or 1 | HiZ |
| GENERAL PURPOSE INPUT/OUTPUT PORT 2 | 0 | HiZ or 1 |
| GENERAL PURPOSE INPUT/OUTPUT PORT 3 | HiZ or 1 | 0 |
| GENERAL PURPOSE INPUT/OUTPUT PORT 4 | HiZ | 0 or 1 |

| CONTROLLED LED | LED0 | LED1 |
|---|---|---|
| CONTROLLED KEY | KEY1 | KEY0 |

FIG. 5B

| INPUT VALUE OF GENERAL PURPOSE INPUT/OUTPUT PORT | | KEY PRESS DETERMINATION | |
|---|---|---|---|
| PORT1 | PORT4 | KEY0 | KEY1 |
| 1 | 1 | × | × |
| 1 | 0 | × | ○ |
| 0 | 1 | ○ | × |
| 0 | 0 | ○ | ○ |

FIG. 7A

|  | state1 | state2 | state3 | state4 |
|---|---|---|---|---|
| GENERAL PURPOSE INPUT/OUTPUT PORT 1 | 0 or 1 | HiZ | 0 | HiZ or 1 |
| GENERAL PURPOSE INPUT/OUTPUT PORT 2 | 0 | HiZ or 1 | 0 or 1 | HiZ or 1 |
| GENERAL PURPOSE INPUT/OUTPUT PORT 3 | HiZ or 1 | 0 | HiZ or 1 | 0 or 1 |
| GENERAL PURPOSE INPUT/OUTPUT PORT 4 | HiZ | 0 or 1 | HiZ or 1 | 0 |

| CONTROLLED LED | LED0 | LED1 | LED2 | LED3 |
|---|---|---|---|---|
| CONTROLLED KEY | KEY1 | KEY0 | (KEY0) | (KEY1) |

FIG. 7B

| INPUT VALUE OF GENERAL PURPOSE INPUT/OUTPUT PORT | | | | KEY PRESS DETERMINATION | |
|---|---|---|---|---|---|
| PORT1 | PORT2 | PORT3 | PORT4 | KEY0 | KEY1 |
| 1 | 1 | 1 | 1 | × | × |
| 1 | 0 | 1 | 0 | × | ○ |
| 0 | 1 | 0 | 1 | ○ | × |
| 0 | 0 | 0 | 0 | ○ | ○ |

FIG. 9A

|  | state1 | state2 |
|---|---|---|
| GENERAL PURPOSE INPUT/OUTPUT PORT 1 | 0 or 1 | HiZ |
| GENERAL PURPOSE INPUT/OUTPUT PORT 2 | 0 | HiZ |
| GENERAL PURPOSE INPUT/OUTPUT PORT 3 | HiZ | 0 |
| GENERAL PURPOSE INPUT/OUTPUT PORT 4 | HiZ | 0 or 1 |

| CONTROLLED LED | LED0 | LED1 |
|---|---|---|
| CONTROLLED KEY | \multicolumn{2}{c}{DETERMINATION USING COMBINATION OF KEY0/KEY1/KEY2} |

FIG. 9B

| INPUT VALUE OF GENERAL PURPOSE INPUT/ OUTPUT PORT | | | | KEY PRESS DETERMINATION | | | REMARKS |
|---|---|---|---|---|---|---|---|
| state1 | | state2 | | | | | |
| PORT3 | PORT4 | PORT1 | PORT2 | KEY0 | KEY1 | KEY2 | |
| 1 | 1 | 1 | 1 | × | | | NO KEY PRESS |
| 1 | 1 | 0 | 1 | ○ | × | × | LED0 IS ON |
| 1 | 1 | 1 | 0 | × | | | TRANSIENT STATUS |
| 0 | 1 | 1 | 1 | × | | | TRANSIENT STATUS |
| 1 | 0 | 1 | 1 | × | ○ | × | LED1 IS ON |
| 1 | 1 | 0 | 0 | × | | | TRANSIENT STATUS |
| 0 | 1 | 0 | 1 | ○ | × | × | LED0 IS OFF |
| 1 | 0 | 0 | 1 | ○ | ○ | × | LED1 IS ON |
| 0 | 1 | 1 | 0 | × | × | ○ | INDEPENDENT OF LED STATE |
| 1 | 0 | 1 | 0 | × | ○ | × | LED1 IS OFF |
| 0 | 0 | 1 | 1 | × | | | TRANSIENT STATUS |
| 0 | 0 | 1 | 0 | × | ○ | ○ | INDEPENDENT OF LED STATE |
| 0 | 0 | 0 | 1 | ○ | ○ | × | LED0 IS OFF/LED1 IS ON |
| 1 | 0 | 0 | 0 | ○ | ○ | × | LED0 IS ON/LED1 IS OFF |
| 0 | 1 | 0 | 0 | ○ | × | ○ | INDEPENDENT OF LED STATE |
| 0 | 0 | 0 | 0 | (×) | | | CONDITIONALLY DISCRIMINABLE |

FIG. 11A

|  | state1 | state2 |
|---|---|---|
| GENERAL PURPOSE INPUT/OUTPUT PORT 1 | 1 | HiZ or 0 |
| GENERAL PURPOSE INPUT/OUTPUT PORT 2 | 0 or 1 | HiZ |
| GENERAL PURPOSE INPUT/OUTPUT PORT 3 | HiZ | 0 or 1 |
| GENERAL PURPOSE INPUT/OUTPUT PORT 4 | HiZ or 0 | 1 |

| CONTROLLED LED | LED0 | LED1 |
|---|---|---|
| CONTROLLED KEY | KEY0 | KEY1 |

FIG. 11B

| INPUT VALUE OF GENERAL PURPOSE INPUT/ OUTPUT PORT | | KEY PRESS DETERMINATION | |
|---|---|---|---|
| PORT2 | PORT3 | KEY0 | KEY1 |
| 0 | 0 | × | × |
| 1 | 0 | × | ○ |
| 0 | 1 | ○ | × |
| 1 | 1 | ○ | ○ |

FIG. 13A

|  | state1 | state2 | state3 |
|---|---|---|---|
| GENERAL PURPOSE INPUT/OUTPUT PORT 1 | 0 or 1 | HiZ | HiZ |
| GENERAL PURPOSE INPUT/OUTPUT PORT 2 | 0 | HiZ or 1 | HiZ or 1 |
| GENERAL PURPOSE INPUT/OUTPUT PORT 3 | HiZ or 1 | 0 | 1 |
| GENERAL PURPOSE INPUT/OUTPUT PORT 4 | HiZ | 0 or 1 | 0 or 1 |
| GENERAL PURPOSE INPUT/OUTPUT PORT 5 | HiZ or 1 | 1 | 0 |

| CONTROLLED LED | LED0 | LED1 | LED2 |
|---|---|---|---|
| CONTROLLED KEY | KEY1 | KEY0 | KEY2 |

FIG. 13B

| KEY0 | IF INPUT VALUE OF PORT1 IS "0" IN state2 |
|---|---|
| KEY1 | IF INPUT VALUE OF PORT4 IS "0" IN state1 |
| KEY2 | IF INPUT VALUE OF PORT1 IS "0" IN state3 |

F I G. 15A

|  | state1 | state2 |
|---|---|---|
| GENERAL PURPOSE INPUT/OUTPUT PORT 1 | 0 | HiZ |
| GENERAL PURPOSE INPUT/OUTPUT PORT 2 | 0 or 1 | 0 or 1 |
| GENERAL PURPOSE INPUT/OUTPUT PORT 3 | HiZ | 0 |

| CONTROLLED LED | LED0 | LED1 |
|---|---|---|
| CONTROLLED KEY | KEY1 | KEY0 |

F I G. 15B

| KEY0 | IF INPUT VALUE OF PORT1 IS "0" IN state2 |
|---|---|
| KEY1 | IF INPUT VALUE OF PORT3 IS "0" IN state1 |

|  | state1 | state2 | state3 |
|---|---|---|---|
| GENERAL PURPOSE INPUT/OUTPUT PORT 1 | 0 or 1 | HiZ | 0 |
| GENERAL PURPOSE INPUT/OUTPUT PORT 2 | 0 | HiZ or 1 | 0 or 1 |
| GENERAL PURPOSE INPUT/OUTPUT PORT 3 | HiZ or 1 | 0 | HiZ |
| GENERAL PURPOSE INPUT/OUTPUT PORT 4 | HiZ | 0 or 1 | HiZ or 1 |

| CONTROLLED LED | LED0 | LED1 | LED2 |
|---|---|---|---|
| CONTROLLED KEY | KEY1 | KEY0 | (KEY0) |

| INPUT VALUE OF GENERAL PURPOSE INPUT/OUTPUT PORT | | | KEY PRESS DETERMINATION | |
|---|---|---|---|---|
| PORT1 | PORT3 | PORT4 | KEY0 | KEY1 |
| 1 | 1 | 1 | × | × |
| 1 | 1 | 0 | × | ○ |
| 0 | 0 | 1 | ○ | × |
| 0 | 0 | 0 | ○ | ○ |

FIG. 18

|  | state1 | state2 | state3 |
|---|---|---|---|
| GENERAL PURPOSE INPUT/OUTPUT PORT 1 | 0 or 1 | HiZ | 0 |
| GENERAL PURPOSE INPUT/OUTPUT PORT 2 | 0 | HiZ or 1 | 0 or 1 |
| GENERAL PURPOSE INPUT/OUTPUT PORT 3 | HiZ or 1 | 0 | 0 |
| GENERAL PURPOSE INPUT/OUTPUT PORT 4 | HiZ | 0 or 1 | 0 or 1 |
| CONTROLLED LED | LED0 | LED1 | LED2 |
| CONTROLLED KEY | KEY1 | KEY0 | none |
| ADDED CONTROLLED LED | none | none | LED1 |

FIG. 19

|  | state1 | state2 | state3 | state4 |
|---|---|---|---|---|
| GENERAL PURPOSE INPUT/OUTPUT PORT 1 | 0 or 1 | HiZ | 0 | 0 |
| GENERAL PURPOSE INPUT/OUTPUT PORT 2 | 0 | HiZ or 1 | 0 or 1 | 0 or 1 |
| GENERAL PURPOSE INPUT/OUTPUT PORT 3 | HiZ or 1 | 0 | 0 | 0 or 1 |
| GENERAL PURPOSE INPUT/OUTPUT PORT 4 | HiZ | 0 or 1 | 0 or 1 | 0 |
| CONTROLLED LED | LED0 | LED1 | LED2 | LED3 |
| CONTROLLED KEY | KEY1 | KEY0 | none | none |
| ADDED CONTROLLED LED | none | none | LED1 | LED0 |

F I G. 20

| | state1 | state2 | state3 | state4 | state5 | state6 | state7 | state8 |
|---|---|---|---|---|---|---|---|---|
| | state1 | state2 | state3 | state4 | state1 | state2 | state3' | state4' |
| GENERAL PURPOSE INPUT/OUTPUT PORT 1 | 0 or 1 | HiZ | 0 | 0 | 0 or 1 | HiZ | 0 | 0 |
| GENERAL PURPOSE INPUT/OUTPUT PORT 2 | 0 | HiZ or 1 | 0 or 1 | 0 or 1 | 0 | HiZ or 1 | 0 or 1 | 0 or 1 |
| GENERAL PURPOSE INPUT/OUTPUT PORT 3 | HiZ or 1 | 0 | 0 | 0 or 1 | HiZ or 1 | 0 | 0 or 1 | 0 or 1 |
| GENERAL PURPOSE INPUT/OUTPUT PORT 4 | HiZ | 0 or 1 | 0 or 1 | 0 | HiZ | 0 or 1 | 0 | 0 |

| CONTROLLED LED | LED0 | LED1 | LED2 | LED3 | LED0 | LED1 | LED2 | LED3 |
|---|---|---|---|---|---|---|---|---|
| CONTROLLED KEY | KEY1 | KEY0 | none | none | KEY1 | KEY0 | none | none |

| ADDED CONTROLLED LED | none | none | LED1 | LED0 | LED0 | none | LED3 | LED2 |
|---|---|---|---|---|---|---|---|---|

ELECTRIC DEVICE AND PRINTING APPARATUS USING THE SAME

BACKGROUND OF THE INVENTION

1. Field of the Invention

The present invention relates to an electric device and a printing apparatus using the same and, particularly, to an electric device including, for example, a plurality of LED lamps and a plurality of switches, and a printing apparatus using the same as part of an operation unit.

2. Description of the Related Art

Operation units of various information processing apparatuses are provided with electric devices each including, for example, switches to be operated by the user, and LED lamps which notify the user of the apparatus operation states.

Japanese Patent Laid-Open No. 2008-033915, for example, discloses a printing apparatus which prints on a print medium using a printhead, and its operation unit uses an electric device formed by an LED lamp and switch as well. Such an electric device normally has a plurality of LED lamps and a plurality of switches, which are controlled by, for example, a microcomputer.

For this control operation, the electric device separately includes input ports which input instructions from the plurality of switches, and output ports which output driving signals to turn on the plurality of LED lamps. Also, input/output signal lines for the plurality of switches and plurality of LED lamps constitute a matrix, which is controlled by the microcomputer. That is, in this control operation, signal lines used for instructions input from the plurality of switches, and those used to drive the LED lamps are shared to time-divisionally control the timings of instructions input from the plurality of switches, and the timings of output of driving signals to drive the LED lamps.

However, in a configuration as in the above-mentioned conventional technique, it is necessary to switch between port input and output at high speed to independently perform LED light emission control and switch input instruction detection control, thus requiring a dedicated logic circuit. Also, this configuration must not only be separately provided with dedicated input and output ports, but also be provided with dedicated signal lines, thus increasing the circuit scale. This raises the manufacturing cost of an electric device including a plurality of LED lamps and a plurality of switches.

Also, in the configuration of the above-mentioned conventional technique, because the LEDs are time-divisionally driven is performed, light emission control of the LEDs cannot be done for a sufficient time, thus lowering the brightnesses of the LEDs. Normally, when an operation unit of an information processing apparatus includes a plurality of LED lamps, the LED lamps desirably have uniform brightnesses in their light emission. It is therefore desirable to perform fine light emission control so as to uniform the light emission brightnesses of the plurality of lamps as much as possible.

In addition, an LED lamp built into an operation unit of an information processing apparatus is often required to provide brightness gradation in a plurality of levels. When, for example, an LED lamp notifies the user of information concerning the ink residual amount in an ink tank in an operation unit of an inkjet printing apparatus, it may be desirable to perform control so as to change the brightness in the following situation. For example, the light emission brightness of the LED lamp is changed to a low brightness if the replacement of the ink tank is desirable as the ink residual amount has become small, and to a high brightness if the replacement of the ink tank is urgent as the ink is exhausted.

SUMMARY OF THE INVENTION

Accordingly, the present invention is conceived as a response to the above-described disadvantages of the conventional art.

For example, an electric device and a printing apparatus using the same according to this invention are capable of controlling a plurality of elements with an inexpensive, simple configuration, and performing fine light emission control of light emitting elements.

According to one aspect of the present invention, there is provided an electric device which performs turn on/off control of a plurality of light emitting elements, and key press detection of a plurality of switches. The device comprises: a plurality of general purpose input/output ports configured to output driving signals to the plurality of light emitting elements, and input signals indicating key press from the plurality of switches; and a control unit configured to time-divisionally perform the turn on/off control of the plurality of light emitting elements and control of the key press detection of the plurality of switches by periodically repeating a predetermined number of time zones, whose number is equal to/more than a number of the light emitting elements, and switching between an input state and output state of each of the plurality of general purpose input/output ports in unit of the single time zone.

According to another aspect of the present invention, there is provided a printing apparatus using an electric device having the above construction as an operation unit.

The invention is particularly advantageous since turn on control of light emitting elements such as LEDs, and switch press detection can be done by time-divisionally controlling the input and output of general purpose input/output ports while switching between their input and output operations without a dedicated logic circuit. This achieves a similar control operation with a configuration simpler than that in the conventional technique, thus contributing to a reduction in apparatus cost as well.

The present invention is also advantageous since it is possible to change the driving duties of a plurality of light emitting elements within the time-divisional driving period of the elements so as to change the light emission time of a specific light emitting element, or uniform the light emission times of a plurality of light emitting elements. Also, general purpose input/output ports are shared in light emitting element turn on/off control and switch key press detection to allow fine light emission control of the light emitting elements while achieving light emitting element turn on/off control and switch key press detection with a configuration simpler than that in the conventional technique.

Further features of the present invention will become apparent from the following description of exemplary embodiments with reference to the attached drawings.

BRIEF DESCRIPTION OF THE DRAWINGS

FIG. 4 is a block diagram showing the configuration of an electric device according to the first embodiment.

FIGS. 5A and 5B are tables showing the control sequence of the electric device, and a key press truth table.

FIGS. 7A and 7B are tables showing the control sequence of the electric device, and a key press truth table according to the second embodiment.

FIGS. 9A and 9B are tables showing the control sequence of the electric device, and a key press truth table according to the third embodiment.

FIGS. 11A and 11B are tables showing the control sequence of the electric device, and a key press truth table according to the fourth embodiment.

FIGS. 13A and 13B are tables showing the control sequence of the electric device, and a key press truth table according to the fifth embodiment.

FIGS. 15A and 15B are tables showing the control sequence of the electric device, and a key press truth table according to the sixth embodiment.

FIG. 18 is a table showing a control sequence for improving the brightnesses of LEDs in the electric device according to the seventh embodiment.

FIG. 19 is a table showing the control sequence of an electric device according to the eighth embodiment.

FIG. 20 is a table showing a control sequence for uniforming the brightnesses of LEDs in the electric device according to the eighth embodiment.

DESCRIPTION OF THE EMBODIMENTS

Exemplary embodiments of the present invention will now be described in detail in accordance with the accompanying drawings.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Further, a "print element" generically means an ink orifice or a liquid channel communicating with it, and an element for generating energy used to discharge ink, unless otherwise specified.

The configuration of a multifunction printer apparatus (to be referred to as an MFP apparatus hereinafter) used as a common embodiment will be described first.

<MFP Apparatus>

Figure 1A:
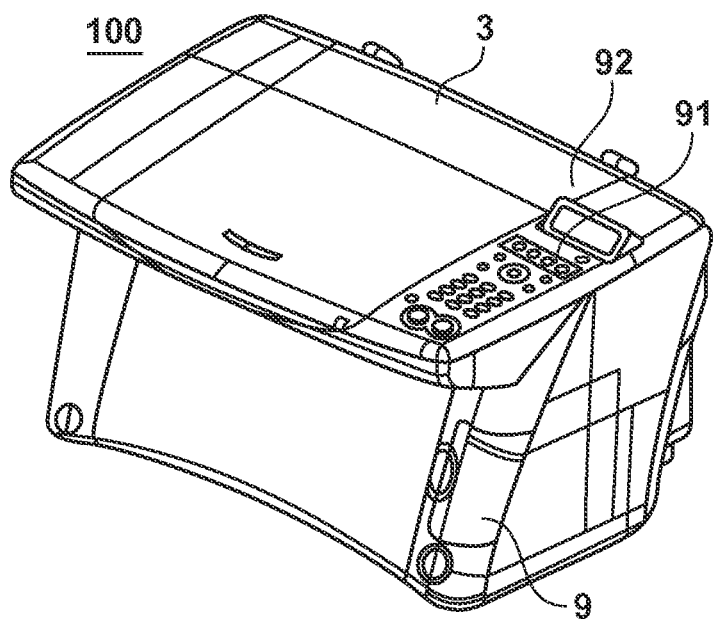
FIGS. 1A and 1B are external perspective views showing the outline of the configuration of a multifunction printer apparatus (MFP apparatus) according to an exemplary embodiment of the present invention.
Figure 1B:
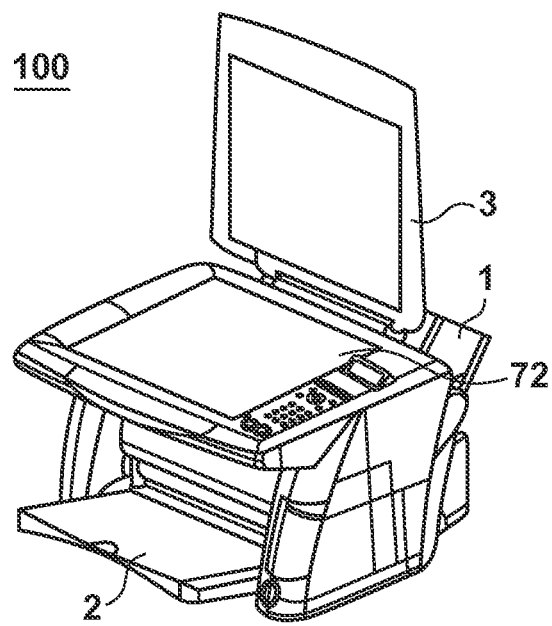

FIGS. 1A and 1B are external perspective views of an MFP apparatus 100 according to an exemplary embodiment of the present invention.

An MFP apparatus can not only print an image on a print medium such as a print sheet based on image data from a host (not shown) connected to it, but also print an image based on image data stored in, for example, a memory card, and read and copy an image document.

FIG. 1A shows the state where a document cover 3 is closed, and FIG. 1B shows the state where a mounting tray 1 for print media, a paper discharge tray 2, and the document cover 3 are open. Also, a reading unit 72 including a contact image sensor (CIS) unit reads an image document, and outputs analog brightness signals of R, G, and B components. A card interface 9 is used to read image data from, for example, a memory card which records an image file, captured by, for example, a digital still camera (not shown), in accordance with a predetermined operation by an operation unit 91 upon inserting the memory card into it. The MFP apparatus 100 is also provided with a display unit such as an LCD 92. The LCD 92 is used to display setting details or a function selection menu by the operation unit 91.

The operation unit 91 includes a plurality of LED lamps (to be simply referred to as LEDs hereinafter) and a plurality of switches, and allows the user to operate the MFP apparatus.

The printing unit of the MFP apparatus includes a printing apparatus including an inkjet printhead (to be simply referred to as a printhead hereinafter), and discharges ink onto a print medium to print an image. The printhead is capable of color printing, and can therefore discharge inks of yellow (Y), magenta (M), cyan (C), and black (K). The MFP includes internal ink tanks which respectively store and supply these inks to the printhead. With the progress of printing, the amount of ink in each ink tank reduces, but the MFP apparatus includes an ink residual amount detection mechanism, which can turn on a predetermined LED lamp when the ink is exhausted to notify the user to that situation. Note that the ink residual amount detection mechanism is already known to those skilled in the art through various patent literatures, and a description thereof will not be given.

Figure 2:
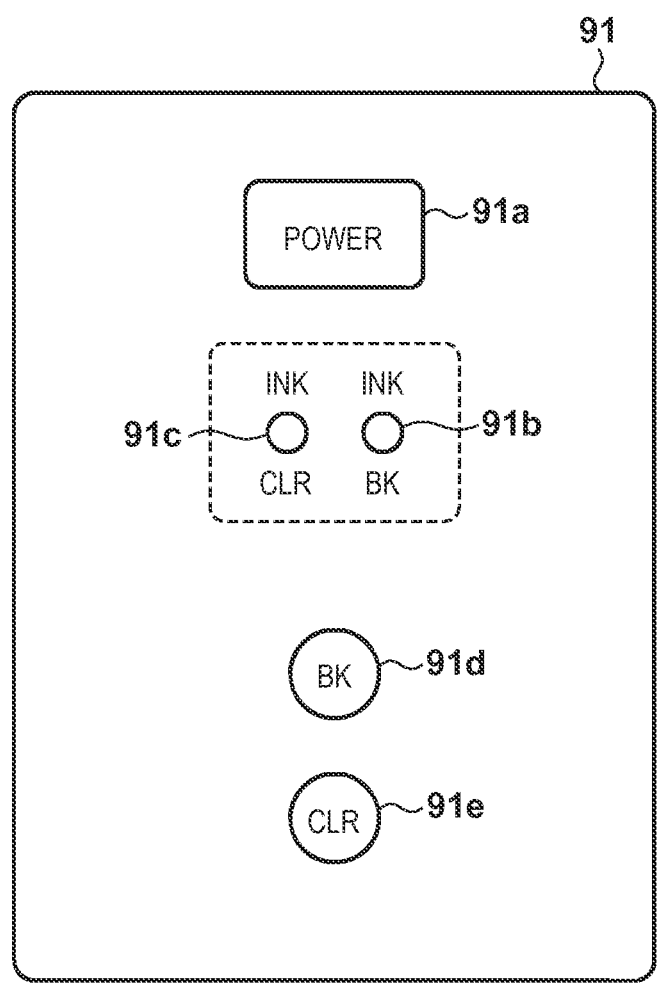
FIG. 2 is a layout diagram showing the partial configuration of an operation unit 91 of the MFP apparatus shown in FIGS. 1A and 1B.

FIG. 2 is a layout diagram showing the partial configuration of the operation unit 91 of the MFP apparatus 100. FIG. 2 shows the layout of especially a portion, which performs an operation associated with the ink tanks of the printing unit, of the operation unit 91 of the MFP apparatus 100.

FIG. 2 shows three switches and three LEDs (light emitting diodes) serving as light emitting elements. A power supply switch 91a includes an LED, which is turned on as the power supply switch 91a is pressed to supply power to the MFP apparatus. When the power supply switch 91a is pressed again while the LED is ON, power supply to the MFP apparatus is disconnected, so the LED is turned off. Two other LEDs 91b and 91c notify the user of the ink residual amounts in ink tanks. The LED 91b is turned on when the ink residual amount in an ink tank which stores black ink has become small. Also, the LED 91c is turned on when the ink residual amount in any of three ink tanks which store inks of yellow (Y), magenta (M), and cyan (C), respectively, has become small. The MFP can use not only LEDs but also laser diodes, electroluminescence devices (EL devices), organic EL devices or the like, as light emission elements.

Other switches 91d and 91e are pressed when the ink tank which stores black ink is replaced, or any of the three ink tanks which store inks of yellow (Y), magenta (M), and cyan (C), respectively, is replaced. With this arrangement, the user can notify the MFP apparatus of completion of the replacement of the ink tank.

Figure 3:
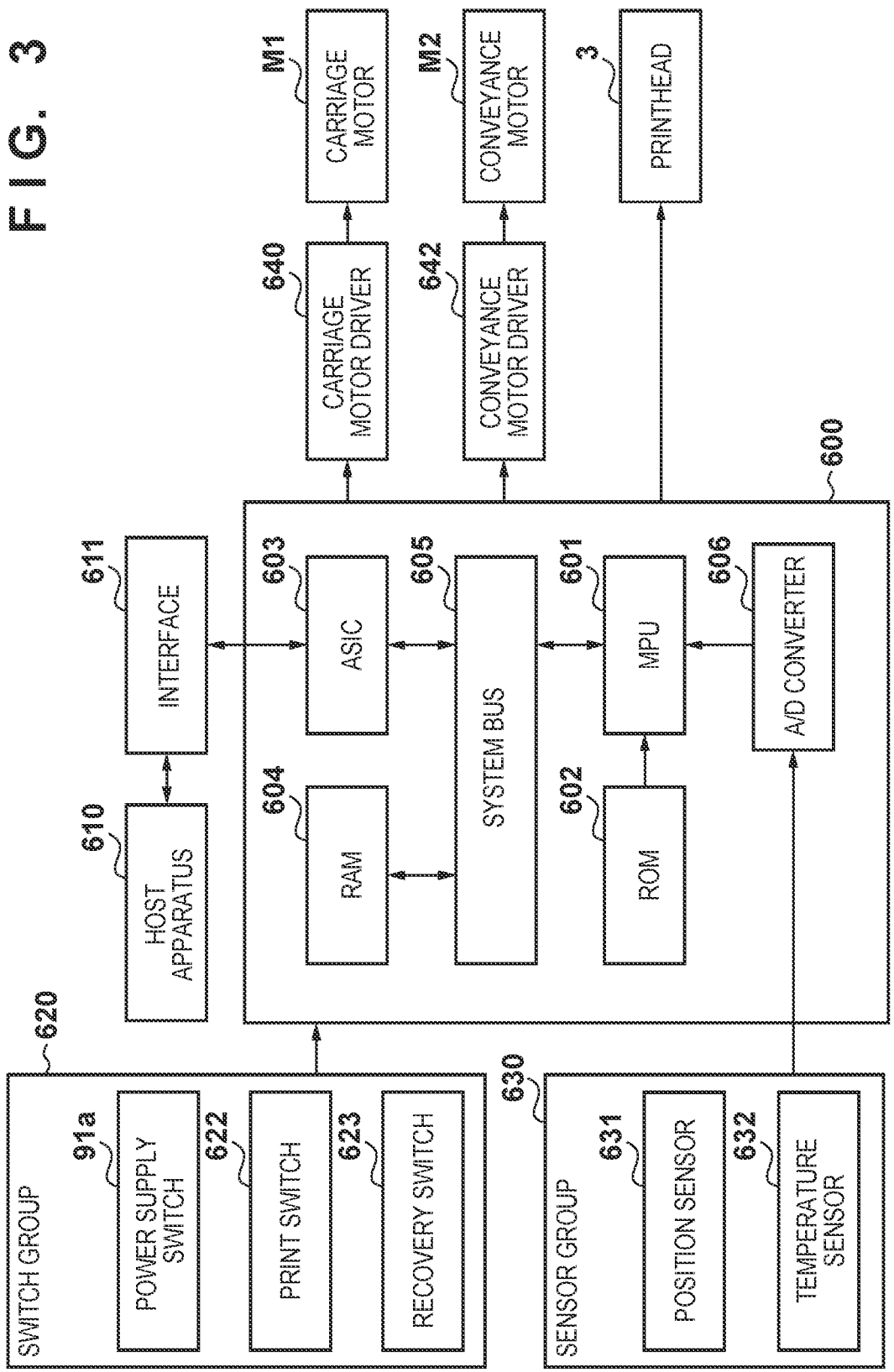
FIG. 3 is a block diagram showing the control configuration of a printing unit of the MFP apparatus shown in FIGS. 1A and 1B.

FIG. 3 is a block diagram showing the control configuration of the printing unit of the MFP apparatus shown in FIGS. 1A and 1B.

A controller 600 includes, for example, an MPU 601, ROM 602, application-specific integrated circuit (ASIC) 603, RAM 604, system bus 605, and A/D converter 606, as shown in FIG. 3. Note that the ROM 602 stores programs, required tables, and other permanent data corresponding to the control sequence. The ASIC 603 generates control signals to control a carriage motor M1, a conveyance motor M2, and a printhead 3. The RAM 604 is used as, for example, an image data expansion area or a working area for program execution. The system bus 605 connects the MPU 601, ASIC 603, and RAM 604 to each other to allow data exchange. The A/D converter 606 receives an analog signal from a sensor group (to be described hereinafter), A/D-converts it, and supplies a digital signal to the MPU 601.

Also, referring to FIG. 3, reference numeral 610 denotes a host apparatus corresponding to the MFP apparatus shown in FIGS. 1A and 1B as an image data supply source. Image data, commands, and statuses, for example, are transmitted/received between the host apparatus 610 and the MFP apparatus 100 via an interface (I/F) 611 by packet communication. Note that as the interface 611, a USB interface may further be provided independently of a network interface to allow reception of bit data or raster data serially transferred from the host.

Moreover, reference numeral 620 denotes a switch group, which is formed by, for example, the power supply switch 91a, a print switch 622, and a recovery switch 623.

Reference numeral 630 denotes a sensor group which is used to detect the apparatus state, and formed by, for example, a position sensor 631 and temperature sensor 632. In this embodiment, the sensor group 630 also includes a photosensor which detects the ink residual amount.

Reference numeral 640 denotes a carriage motor driver which drives the carriage motor M1 for reciprocally scanning a carriage; and 642, a conveyance motor driver which drives the conveyance motor M2 for conveying a print medium.

The ASIC 603 transfers data to drive a print element (discharge heater) of the printhead 3 while directly accessing the storage area of the RAM 604 in print scanning by the printhead 3.

Several embodiments of an electric device which is used in the operation unit 91 of the MFP apparatus with the above-mentioned configuration, and is built into the controller 600 will be described below.

[First Embodiment]

FIG. 4 is a block diagram showing the configuration of an electric device according to the first embodiment. Note that the same reference numerals as in FIG. 3 denote the same constituent elements in FIG. 4, and a description thereof will not be given.

This electric device executes turn on control of two LEDs 91b and 91c (first and second LEDs) shown in FIG. 2, and key input control of two switches 91d and 91e (first and second switches) shown in FIG. 2.

This electric device is implemented only by switching of a general purpose input/output (GPIO) 608 by an MPU 601. That is, the general purpose input/output (GPIO) 608 is an input/output control circuit. The general purpose input/output (GPIO) 608 is connected to the MPU 601 via a system bus 605. The MPU 601 periodically performs a general purpose port switching process in a time period set in a timer (TIMER) 607. The MPU 601 sets a given value in a register (not shown) included in the general purpose input/output (GPIO) 608 in each designated period to change the states of four general purpose input/output ports (PORT1 to PORT4) 609a to 609d. The general purpose input/output ports 609a to 609d have high and low level states as output states, and a high impedance state as an input state, of signal states. Note that the four general purpose input/output ports will also be referred to as first, second, third, and fourth general purpose input/output ports hereinafter.

As shown in FIG. 4, the first general purpose input/output port (PORT1) is connected to the anode of the LED 91b, and one terminal of the switch 91d, while the second general purpose input/output port (PORT2) is connected to the cathode of the LED 91b, and one terminal of the switch 91e. Also, the third general purpose input/output port (PORT3) is connected to the cathode of the LED 91c, and the other terminal of the switch 91d, while the fourth general purpose input/output port (PORT4) is connected to the anode of the LED 91c, and the other terminal of the switch 91e.

Referring to FIG. 4, to output a driving signal and thereby perform turn on control of the LED 91b indicated by LED0, the output level of the general purpose input/output port 609a (PORT1) is set high, while that of the general purpose input/output port 609b (PORT2) is set low. In contrast to this, to output a driving signal and thereby perform turn off control of LED0, the output levels of the general purpose input/output ports 609a and 609b need only be set identical. The general purpose input/output ports may be set in either an output or input state at this time as long as they have identical levels.

Also, since the LED is turned on only when their two ends have a large potential difference, it is not turned on even when a combination of high level output and input high impedance states is used.

Similarly, to control the LED 91c indicated by LED1, the general purpose input/output ports 609c and 609d (PORT3 and PORT4) are controlled.

In contrast to this, for switch key press detection, the general purpose input/output ports 609a to 609d are pulled up by resistors R1 to R4, respectively, so key press is detected when input of low level to each general purpose input/output port is confirmed, as shown in FIG. 4.

The sequence of key press detection is as follows. That is, first, a low-level signal is output from the general purpose input/output port 609b (PORT2). At the same time, the general purpose input/output port 609d (PORT4) is set in an input state.

If the switch 91e indicated by KEY1 is not pressed, the general purpose input/output port 609d (PORT4) is pulled up, so a high-level signal is input to the general purpose input/output port 609d (PORT4). In contrast to this, if KEY1 is pressed, the general purpose input/output port 609b (PORT2) is electrically connected to the general purpose input/output port 609d (PORT4), so a low-level signal is input to the general purpose input/output port 609d (PORT4).

Key press of the switch 91d indicated by KEY0 can be detected by a control operation similar to the case of KEY1. That is, in the case of KEY0, a low-level signal is output from the general purpose input/output port 609c (PORT3) to set the general purpose input/output port 609a (PORT1) in an input state to allow key press detection of KEY0 in accordance with a control sequence similar to the case of KEY1.

With this arrangement, turn on/off control of two LEDs and key press detection of two switches can be attained at once.

As summarized, to perform turn on control of LED0, a low-level signal is output from the general purpose input/output port 609b (PORT2). A low-level signal output from the general purpose input/output port 609b (PORT2) is required to detect key press of KEY1. This means that the general purpose input/output port 609b (PORT2) generates a low-level signal so as to turn on LED0, and also generates a low-level signal so as to detect key press of KEY1. To detect key press of KEY1, the general purpose input/output port 609d (PORT4) is set in an input high impedance state. By setting this state, key press of KEY1 is detected while performing turn on control of LED0.

To perform turn off control of LED0, low-level signals are output from both the general purpose input/output port 609a (PORT1) and general purpose input/output port 609b (PORT2) to turn off LED0, thereby allowing a similar control operation, regardless of the ON/OFF states of the LEDs.

When LED1 is to be kept OFF while the general purpose input/output port 609d (PORT4) is in an input state, this can be done as long as the general purpose input/output port 609c (PORT3) is set in an input high impedance or outputs a high-level signal.

Note that a supplementary description of signal output for turn on control of LED1, and key press detection of KEY0 will be given below. The GPIO 610 generates a low-level signal from the general purpose input/output port 609c (PORT3) so as to be able to not only turn on LED1 but also detect key press of KEY0.

FIGS. 5A and 5B are tables showing a control sequence and a key press truth table.

FIG. 5A shows two states: state1 and state2 indicating the states of general purpose input/output ports, which can be periodically switched by timer control, in different time zones when time-divisional control is performed for two LEDs and two switches. FIG. 5A also shows an LED and a switch serving as controlled targets in each state. Each of the two states (first and second states (state1 and state2)) in this embodiment continues for 2 msec, so turn on/off control of two LEDs and press detection control of two switches can be performed in a period of 4 msec.

Also, referring to FIG. 5A, "0" indicates low-level signal output, "1" indicates high-level signal output, and "HiZ" indicates input high impedance. "0 or 1" indicates that high-level signal output is performed if an LED serving as a controlled target in the corresponding state is turned on, while low-level signal output is performed if the LED is turned off. "HiZ or 1" indicates the state when an LED serving as a non-controlled target in the corresponding state is turned off.

When either of input high impedance and high-level signal output is used, an LED serving as a non-controlled target is not turned on, so either one of the input high impedance and high-level signal output which is more advantageous in terms of control can be selected.

Although FIG. 5A shows only two states: state1 and state2 in time-divisional control, repeated control of these two states allows LED turn on/off control of LED0 and LED1, and key press detection control of KEY0 and KEY1.

In the key press truth table shown in FIG. 5B, PORT1 indicates the input value of the general purpose input/output port 609a (PORT1) in state2, and PORT4 indicates the input value of the general purpose input/output port 609d (PORT4) in state1. If the input value of the general purpose input/output port 609a (PORT1) is "1" in state2, KEY0 is not pressed; or if this input value is "0" in state2, KEY0 is pressed. However, if the input value of the general purpose input/output port 609d (PORT4) is "1" in state1, KEY1 is not pressed; or if this input value is "0" in state 1, KEY1 is pressed.

The left side of FIG. 5B shows that key press of KEY0 can be detected in accordance with the input value of PORT1, while key press of KEY1 can be detected in accordance with the input value of PORT4 when the electric device has a configuration shown in FIG. 4. Key press can be detected when KEY0 and KEY1 are simultaneously pressed. Note that referring to the right side of FIG. 5B, o indicates the state where a corresponding switch is pressed, and x indicates the state where a corresponding switch is not pressed.

As described above, according to this embodiment, a configuration which uses both input and output ports allows press detection of two switches, and turn on/off control of two LEDs. Also, the above-mentioned control operations can be performed using a general purpose input/output port and a CPU without using a dedicated logic circuit. Hence, unlike the conventional configuration, a configuration which requires none of a dedicated input port, dedicated output port, and dedicated logic circuit can realize press detection of two switches, and turn on/off control of two LEDs, thus contributing to reducing the circuit cost.

[Second Embodiment]

An example of an electric device with a configuration which executes turn on control of four LEDs, and key input control of two switches will be described.

Figure 6:
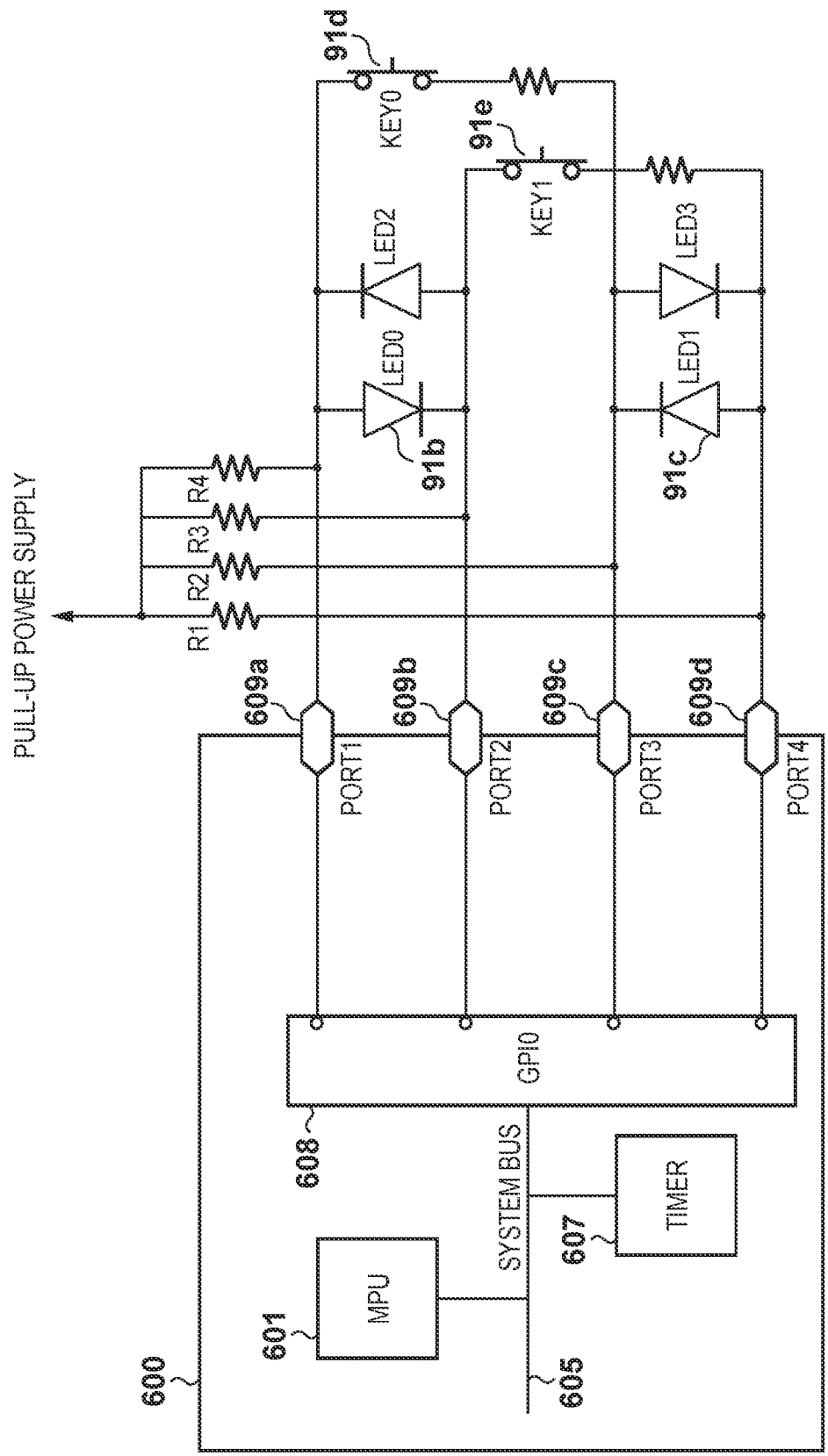
FIG. 6 is a block diagram showing the configuration of an electric device according to the second embodiment.

FIG. 6 is a block diagram showing the configuration of an electric device according to the second embodiment. Note that the same reference numerals as in FIGS. 3 and 4 denote the same constituent elements in FIG. 6, and a description thereof will not be given.

As can be seen from a comparison between FIGS. 6 and 4, LED2 and LED3 are added in this embodiment. These LEDs correspond to other LED lamps (not shown) provided in an operation unit 91. The anodes and cathodes of LED2 and LED3 are connected in directions opposite to those of the anodes and cathodes of LED0 and LED1, as shown in FIG. 6.

FIGS. 7A and 7B are tables showing a control sequence and a key press truth table.

The control sequence shown in FIG. 7A is obtained by adding turn on/off control of LED2 and LED3 to that shown in FIG. 5A according to the first embodiment. Also, key press detection shown in FIG. 7B can be attained based on low-level signal output of general purpose input/output port 1 (PORT1) and general purpose input/output port 4 (PORT4) required for turn on/off control of LED2 and LED3, as in the control sequence shown in FIG. 7A.

Although, as shown in FIG. 7A, key press has already been detected at the timings of state1 and state2, this can be done at the timings of state3 and state4 as well. When key press is detected at the timings of state3 and state4, general purpose input/output port 3 (PORT3) must have input high impedance in state3, and general purpose input/output port 2 (PORT2) must have input high impedance in state4.

With the truth table, shown in FIG. 7B, of the electric device shown in FIG. 6, key press of KEY0 can be detected in accordance with the input value of PORT1 or PORT3, while key press of KEY1 can be detected in accordance with the input value of PORT2 or PORT4.

As described above, according to this embodiment, a configuration which uses both input and output ports allows press detection of two switches, and turn on/off control of four LEDs.

[Third Embodiment]

An example of an electric device with a configuration which executes turn on control of two LEDs, and key input control of three switches will be described.

Figure 8:
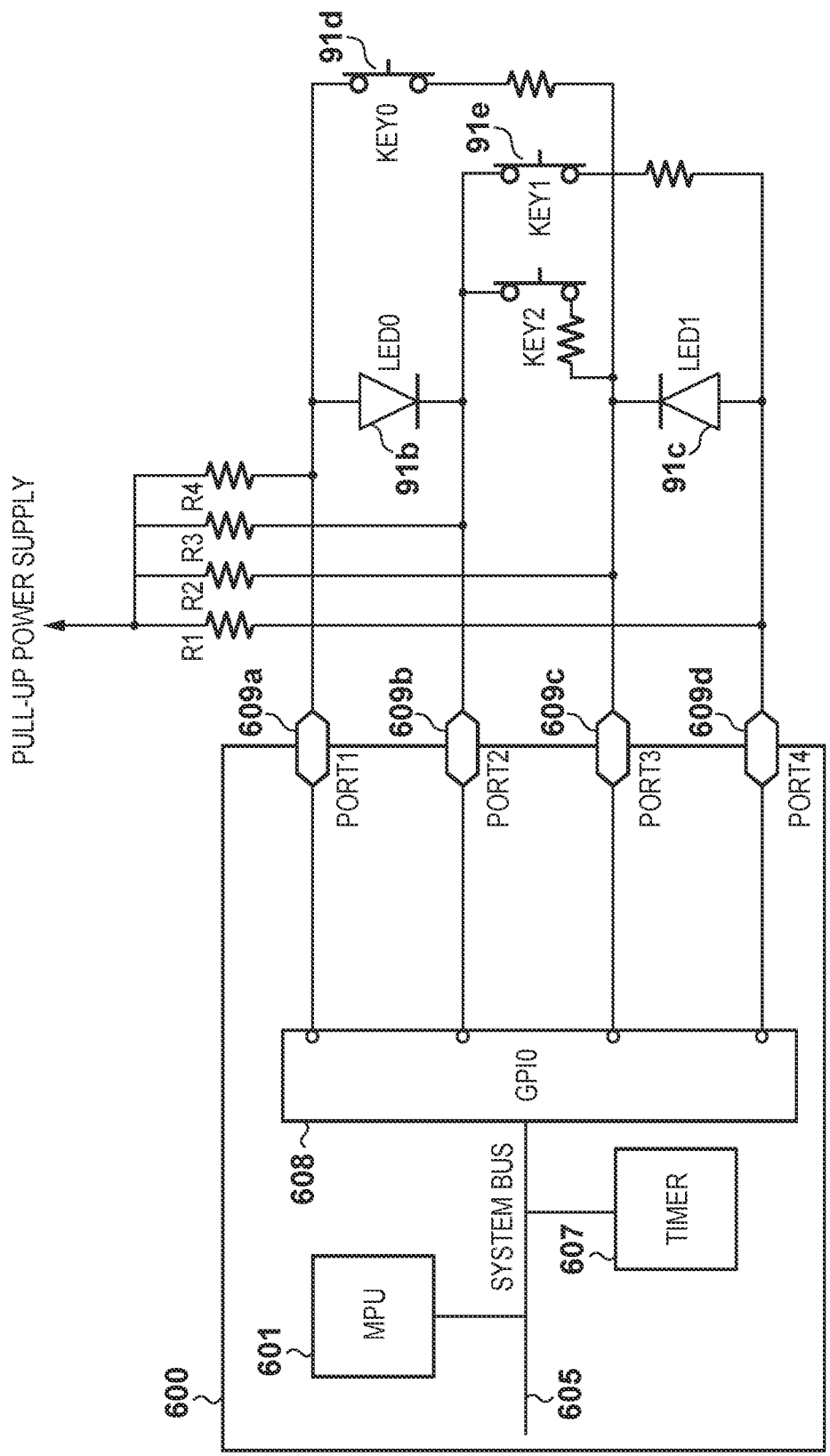
FIG. 8 is a block diagram showing the configuration of an electric device according to the third embodiment.

FIG. 8 is a block diagram showing the configuration of an electric device according to the third embodiment. Note that the same reference numerals as in FIGS. 3 and 4 denote the same constituent elements in FIG. 8, and a description thereof will not be given.

As can be seen from a comparison between FIGS. 8 and 4, one switch (KEY2) is added in this embodiment. This switch corresponds to another switch provided in an operation unit 91 and, for example, a switch 91a. As shown in FIG. 8, KEY2 is added between general purpose input/output port 2 (PORT2) and general purpose input/output port 3 (PORT3). Because the electric device according to this embodiment performs turn on control of two LEDs (LED0 and LED1), the turn on/off control is the same as in the first embodiment.

Key press detection of KEY2 can be realized by detecting low-level signal output of general purpose input/output port 2 (PORT2) used to perform turn on/off control of LED0 as low-level signal input by setting general purpose input/output port 3 (PORT3) at input high impedance. Similarly, key press detection of KEY2 can also be realized by detecting low-level signal output of general purpose input/output port 3 (PORT3) used to perform turn on/off control of LED1 as low-level signal input by setting general purpose input/output port 2 (PORT2) at input high impedance.

FIGS. 9A and 9B are tables showing a control sequence and a key press truth table.

As can be seen from a comparison between FIGS. 9A and 5A, the third embodiment is different from the first embodiment in that the general purpose input/output port 3 (PORT3) is set only at input high impedance in state1, while the general purpose input/output port 2 (PORT2) is set only at input high impedance in state2. This occurs because in state1 the general purpose input/output port 3 (PORT3) is set at input high impedance, and low-level signal input of the general purpose input/output port 2 (PORT2) is detected to detect press of KEY2. Similarly, this occurs because in state2 the general purpose input/output port 2 (PORT2) is set at input high impedance, and low-level signal input of the general purpose input/output port 3 (PORT3) is detected to detect press of KEY2.

Key press detection of the electric device shown in FIG. 8 is discriminated in accordance with the combination of the input values of input high impedances in state1 and state2, as will be described below.

With the truth table, shown in FIG. 9B, of the electric device shown in FIG. 8, which one of switches: KEY0, KEY1, and KEY2 is pressed is detected from in accordance with the combination of the input values of state1 and state2. The "remarks" column indicates the states of LED0 and LED1.

In the "remarks" column, "NO KEY PRESS" indicates the state where none of the keys are pressed, and "LED0 IS ON" indicates the KEY pressed state when turn on control is performed for LED0 by the general purpose input/output ports 1 and 2. "LED0 IS OFF" indicates the KEY pressed state when turn off control is performed for LED0 by the general purpose input/output ports 1 and 2. "LED1 IS ON" and "LED1 IS OFF" indicate that turn on/off control is performed for LED1 by the general purpose input/output ports 3 and 4. "INDEPENDENT OF LED STATE" indicates the KEY pressed state when the state of the truth table is set regardless of the ON/OFF states of LED0 and LED1. "TRANSIENT STATUS" indicates that a transient status temporarily happens depending on the timing at which the input value is confirmed, and that at which a key is pressed by the user. In this case, if the input value is confirmed again a state other than the transient status is set. "CONDITIONALLY DISCRIMINABLE" indicates that press of all keys can be detected in the state where LED0 and LED1 are ON, but not when both LED0 and LED1 are OFF because the state is the same as that upon press of KEY0 and KEY1 in this case. That is, it means key press can be detected conditionally only when LED0 and LED1 are ON.

As described above, according to this embodiment, a configuration which uses both input and output ports allows press detection of three switches, and turn on/off control of two LEDs.

[Fourth Embodiment]

An example of an electric device with a configuration which executes turn on control of two LEDs, and key input control of two switches will be described.

Figure 10:
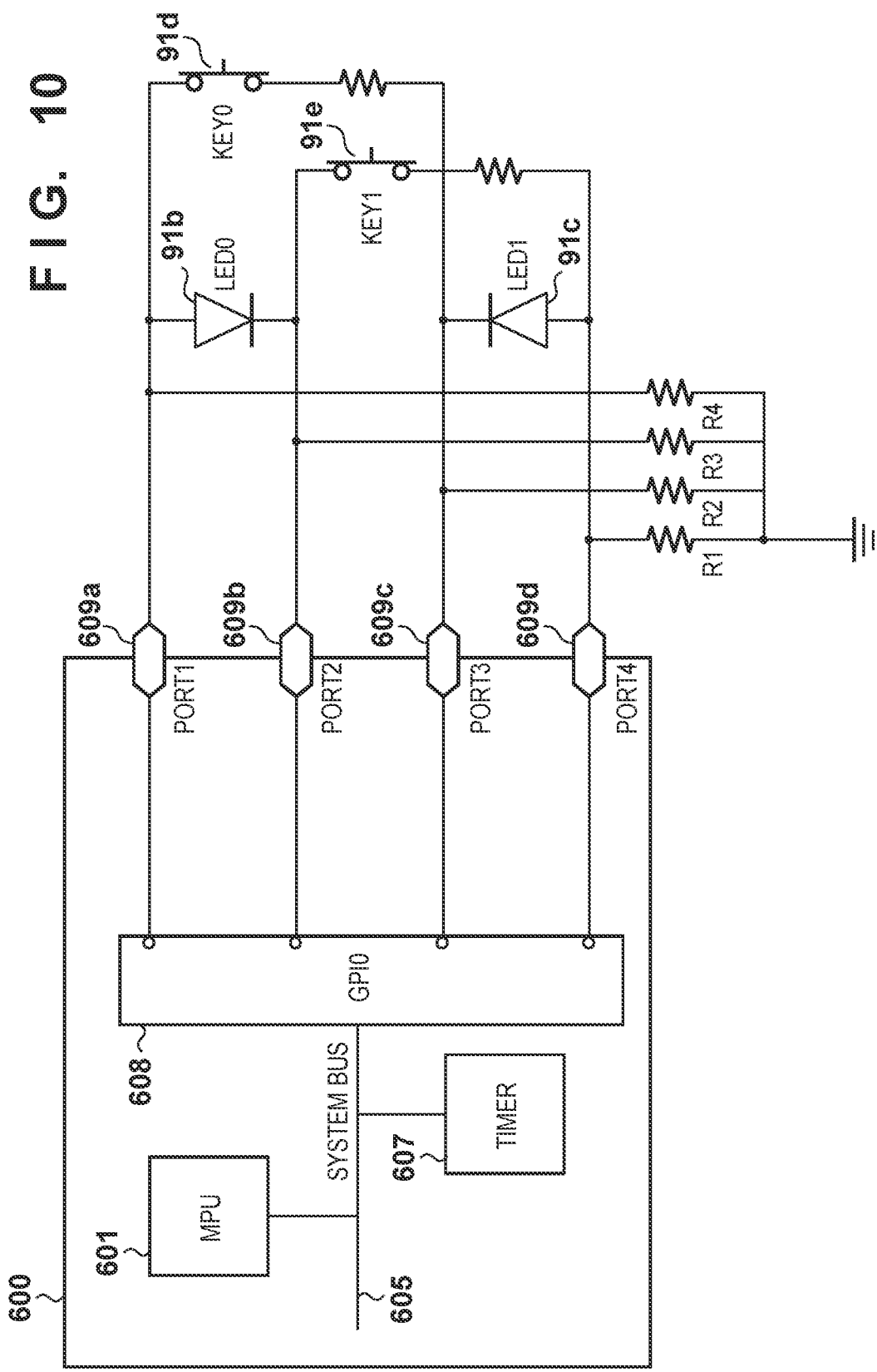
FIG. 10 is a block diagram showing the configuration of an electric device according to the fourth embodiment.

FIG. 10 is a block diagram showing the configuration of an electric device according to the fourth embodiment. Note that the same reference numerals as in FIGS. 3 and 4 denote the same constituent elements in FIG. 10, and a description thereof will not be given.

As can be seen from a comparison between FIGS. 10 and 4, the difference in terms of configuration merely lies in that all of four general purpose input/output ports are pulled up in the first embodiment, while they are pulled down in the fourth embodiment. Therefore, as for turn on/off control of two LEDs, turn on/off control of LED0 is performed by the general purpose input/output ports 1 and 2, while turn on/off control of LED1 is performed by the general purpose input/output ports 3 and 4, as in the first embodiment.

Key press is detected by detecting low-level signal input in the configuration shown in FIG. 4 according to the first embodiment, while this is done by detecting high-level signal input in the configuration shown in FIG. 10 according to the fourth embodiment.

FIGS. 11A and 11B are tables showing a control sequence and a key press truth table.

As described above, according to this embodiment, a configuration which uses both input and output ports and pulls down all general purpose input/output ports allows press detection of two switches, and turn on/off control of two LEDs.

[Fifth Embodiment]

An example of an electric device with a configuration which executes turn on control of three LEDs, and key input control of three switches will be described.

Figure 12:
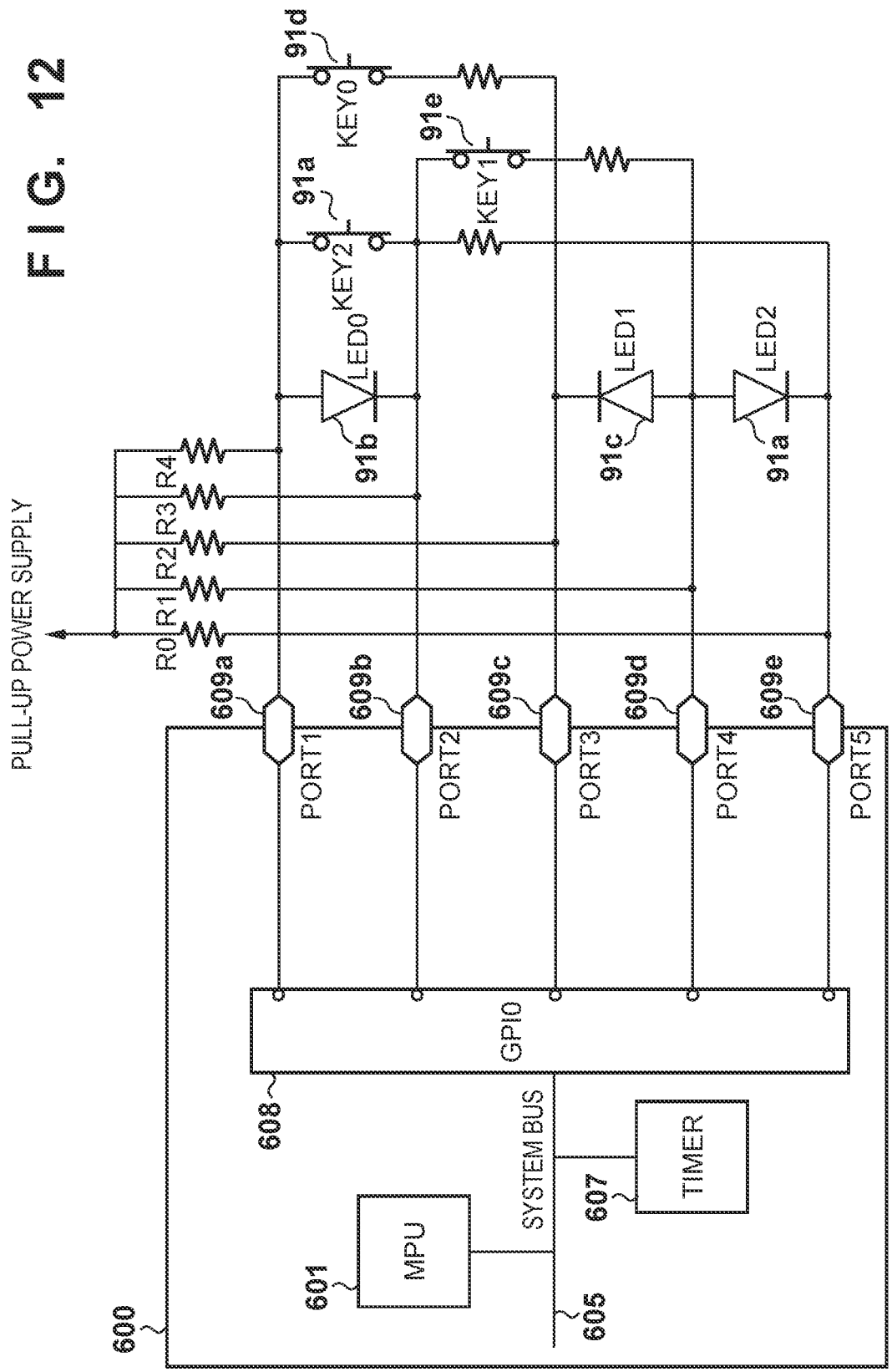
FIG. 12 is a block diagram showing the configuration of an electric device according to the fifth embodiment.

FIG. 12 is a block diagram showing the configuration of an electric device according to the fifth embodiment. Note that the same reference numerals as in FIGS. 3 and 4 denote the same constituent elements in FIG. 12, and a description thereof will not be given.

This electric device executes turn on control of three LEDs 91a, 91b, and 91c shown in FIG. 2, and key input control of three switches 91a, 91d, and 91e (the LED 91a is embedded in the switch 91a).

As can be seen from a comparison between FIGS. 12 and 4, the total number of the general purpose input/output ports has increased from four to five in the electric device according to this embodiment. The basic operation in this embodiment is the same as in the above-mentioned embodiments, and a description thereof will not be given.

FIGS. 13A and 13B are tables showing a control sequence and key press truth table applied to the electric device shown in FIG. 12.

In all cases, the use of the electric device according to this embodiment allows press detection of all the switches of the operation unit shown in FIG. 2, and turn on/off control of all the LEDs shown in FIG. 2.

[Sixth Embodiment]

An example of an electric device which executes turn on control of two LEDs, and key input control of two switches with a configuration simpler than that described in the first embodiment will be described.

Figure 14:
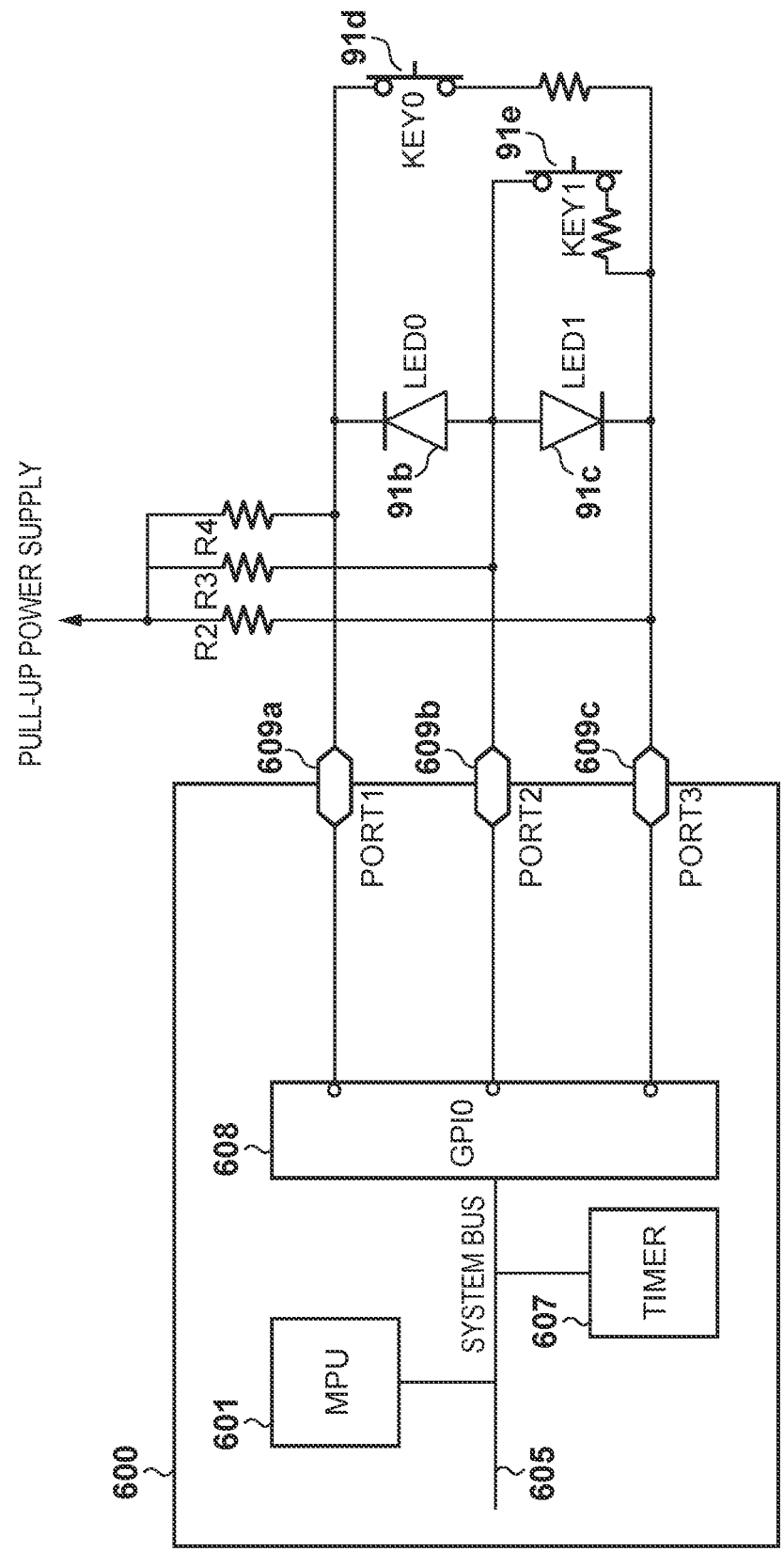
FIG. 14 is a block diagram showing the configuration of an electric device according to the sixth embodiment.

FIG. 14 is a block diagram showing the configuration of an electric device according to the sixth embodiment. Note that the same reference numerals as in FIGS. 3 and 4 denote the same constituent elements in FIG. 14, and a description thereof will not be given.

As can be seen from a comparison between FIGS. 14 and 4, the total number of the general purpose input/output ports has decreased from four to three in the electric device according to this embodiment. The basic operation in this embodiment is the same as in the above-mentioned embodiments, and a description thereof will not be given.

FIGS. 15A and 15B are tables showing a control sequence and key press truth table applied to the electric device shown in FIG. 14.

Hence, according to the above-mentioned embodiment, press detection of two switches, and turn on/off control of two LEDs, which are identical to those in the first embodiment, can be performed in consideration of the control sequence without limiting the number of the general purpose input/output ports to four.

[Seventh Embodiment]

Figure 16:
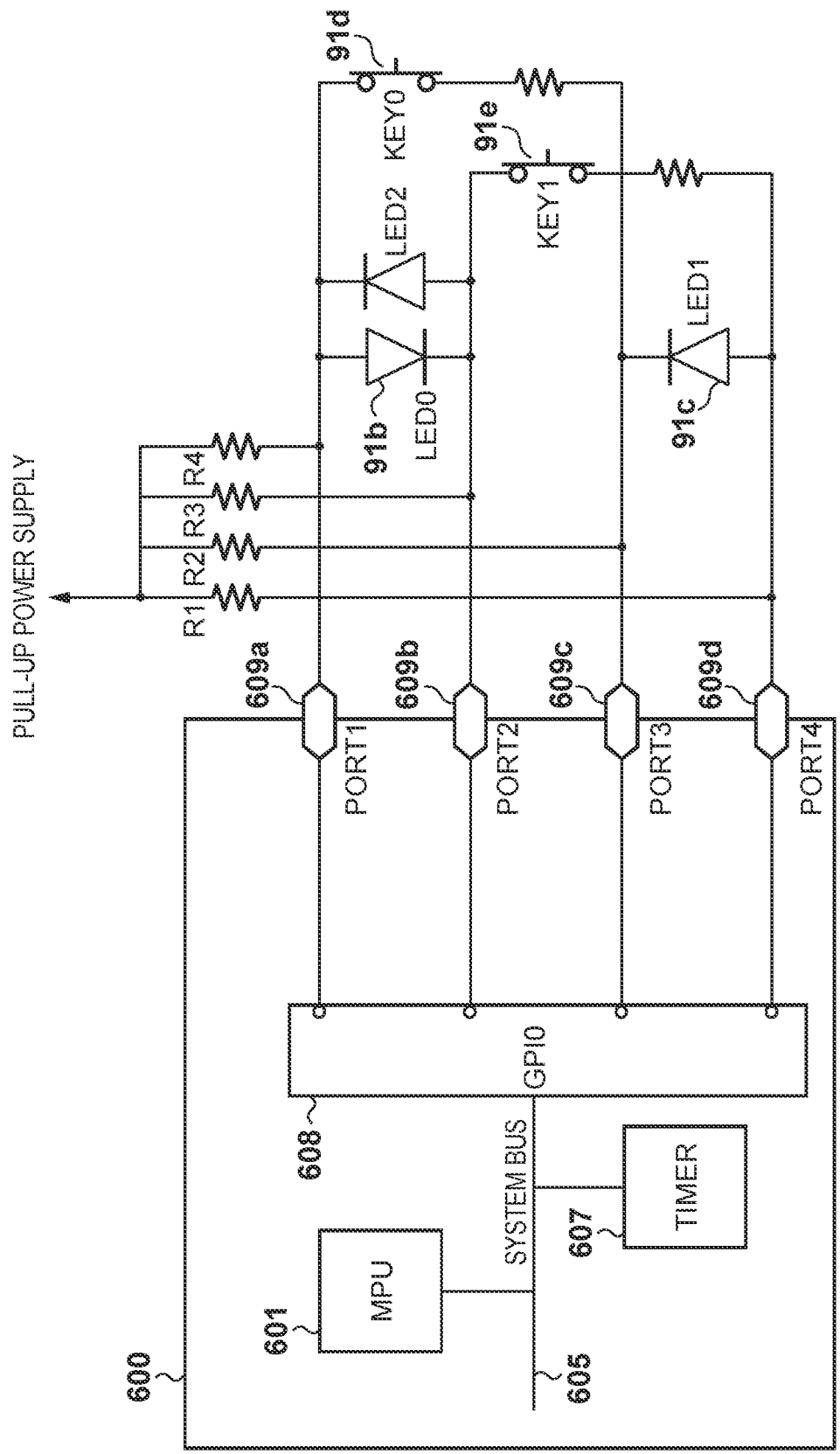
FIG. 16 is a block diagram showing the configuration of an electric device according to the seventh embodiment.

FIG. 16 is a block diagram showing the configuration of an electric device according to the seventh embodiment. Note that the same reference numerals as in FIGS. 3 and 4 denote the same constituent elements in FIG. 16, and a description thereof will not be given.

This electric device executes turn on control of three LEDs 91b and 91c and LED2 (first, second, and third LEDs) shown in FIG. 16, and key input control of two switches 91d and 91e (first and second switches) shown in FIG. 16. LED2 corresponds to another LED lamp (not shown) provided in an operation unit 91.

As shown in FIG. 16, the first general purpose input/output port (PORT1) is connected to the anode of the LED 91b, the cathode of LED2, and one terminal of the switch 91d. The second general purpose input/output port (PORT2) is connected to the cathode of the LED 91b, the anode of LED2, and one terminal of the switch 91e.

The general purpose input/output ports 609a and 609b (PORT1 and PORT2) are controlled in controlling LED2, while the logic reverses to a case where LED0 is controlled.

The sequence of key press detection is the same as in the configuration shown in FIG. 4, and is controlled in the following way to realize turn on/off control of three LEDs, and key press detection of two switches at once.

That is, in turn on/off control of LED2, a low-level signal is outputted from the general purpose input/output port 609a (PORT1), and the general purpose input/output port 609c (PORT3) is set at input high impedance to allow key press detection of KEY0. However, this detection process overlaps turn on/off control of LED0, and therefore may or may not be done.

Note that a supplementary description of turn on control of LED1, and signal output for key press detection of KEY0 will be given below. The general purpose input/output port 609a (PORT1) generates a low-level signal so as to turn on LED2, and generates a low-level signal so as to detect key press of KEY0.

Figure 17A:
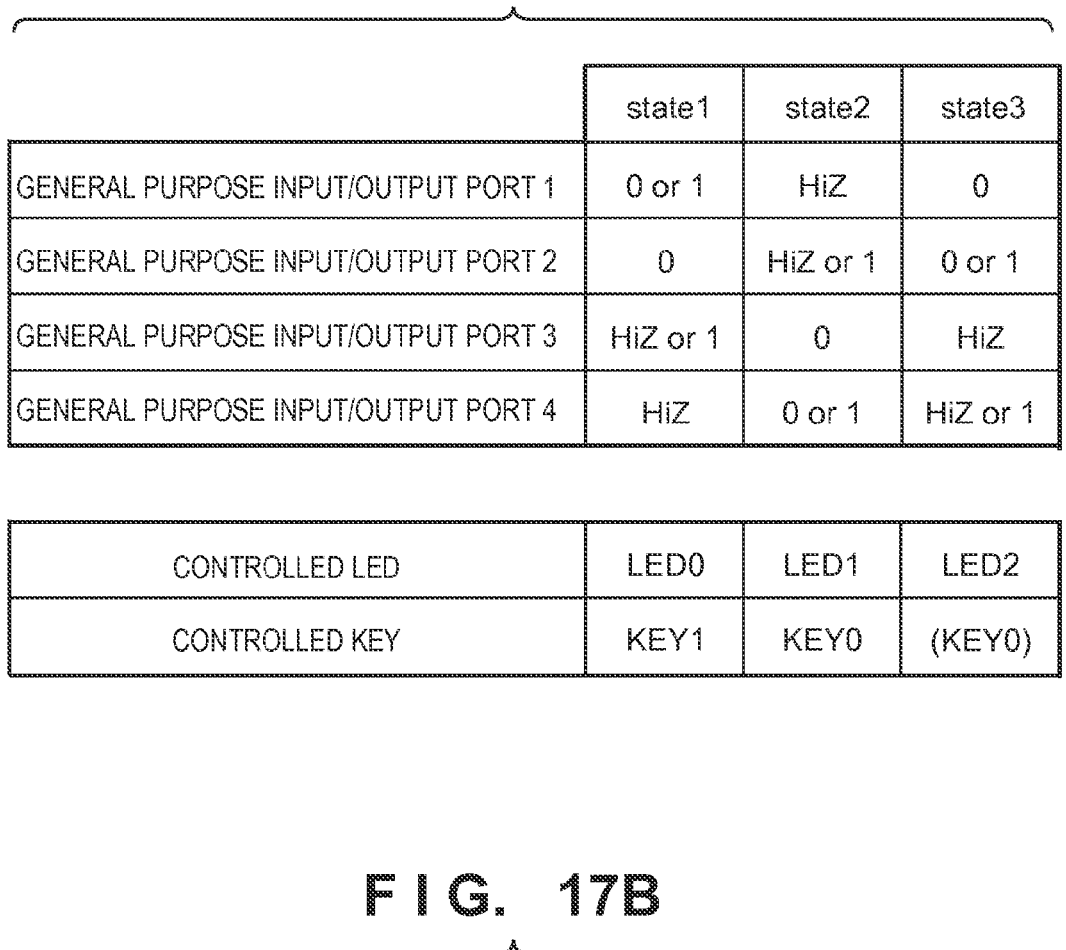
FIGS. 17A and 17B are tables showing the control sequence of the electric device, and a key press truth table according to the seventh embodiment.
Figure 17B:
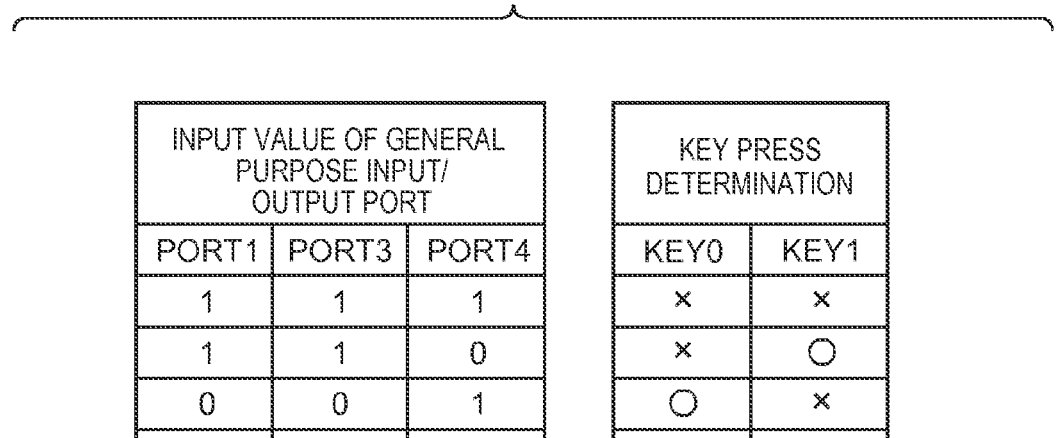

FIGS. 17A and 17B are tables showing a control sequence and a key press truth table.

FIG. 17A shows three states: state1, state2, and state3 indicating the states of general purpose input/output ports, which can be periodically switched by timer control, in different time zones when time-divisional control is performed for three LEDs and two switches. FIG. 17A also shows an LED and a switch serving as controlled targets in each state. Each of the three states (first, second, and third states) in this embodiment continues for 2 msec, so turn on/off control of three LEDs and press detection control of two switches can be performed in a period of 6 msec.

Also, referring to FIG. 17A, "0" indicates low-level signal output, "1" indicates high-level signal output, and "HiZ" indicates input high impedance. "0 or 1" indicates that high-level signal output is performed if an LED serving as a controlled target in the corresponding state is turned on, while low-level signal output is performed if the LED is turned off. "HiZ or 1" indicates the state when an LED serving as a non-controlled target in the corresponding state is turned off.

When either of input high impedance and high-level signal output is used, an LED serving as a non-controlled target is not turned on, so one of the input high impedance and high-level signal output which is more advantageous in terms of control can be selected.

FIG. 17A shows only three states: state1, state2, and state3 in time-divisional control. However, repeated control of these three states allows LED turn on/off control of LED0, LED1, and LED2, and key press detection control of KEY0 and KEY1.

In the key press truth table shown in the left side of FIG. 17B, PORT1 indicates the input value of the general purpose input/output port 609a (PORT1) in state2. Also, PORT3 indicates the input value of the general purpose input/output port 609c (PORT3) in state3, and PORT4 indicates the input value of the general purpose input/output port 609d (PORT4) in state1.

If the input value of the general purpose input/output port 609a (PORT1) is "1" in state2, KEY0 is not pressed; or if this input value is "0" in state2, KEY0 is pressed. However, if the input value of the general purpose input/output port 609d (PORT4) is "1" in state1, KEY1 is not pressed; or if this input value is "0" in state 1, KEY1 is pressed. Again, if the input value of the general purpose input/output port 609c (PORT3) is "1" in state3, KEY0 is not pressed; or if this input value is "0" in state 3, KEY0 is pressed.

FIG. 17B shows that key press of KEY0 can be detected in accordance with the input values of PORT1 and PORT3, while key press of KEY1 can be detected in accordance with the input value of PORT4 when the electric device has a configuration shown in FIG. 16. Key press can be detected when KEY0 and KEY1 are simultaneously pressed. Note that referring to the right side of FIG. 17B, o indicates the state where the corresponding switch is pressed, and x indicates the state where the corresponding switch is not pressed.

As can be seen from the control sequence shown in FIG. 17A, key control need not always be performed in state3, but nonetheless all of the three LEDs and two switches can be controlled.

FIG. 18 is a table showing a control sequence when finer LED control is performed.

As can be seen from a comparison between FIGS. 18 and 17A, according to the control sequence shown in FIG. 18, turn on/off control of LED1 is executed in state3 while controlling the three LEDs and two switches shown in FIG. 16.

According to the control sequence shown in FIG. 17A, one LED serves as a controlled target in each state. That is, LED0 is controlled in state1, LED1 is controlled in state2, and LED2 is controlled in state3. In contrast to this, according to the control sequence shown in FIG. 18, two LEDs: LED1 and LED2 are controlled in state3. With such an operation, turn on control of LED1 can be performed in two time zones (state2 and state3 in this case) in the control periods of state1 to state3.

In other words, in the control periods of state1 to state3, the driving duty for LED1 is changed to ⅔ in place of ⅓ to perform control so as to prolong the light emission time of LED1. This makes it possible to realize control for performing low-brightness light emission upon setting the driving duty of LED1 to ⅓ in accordance with the sequence shown in FIG. 17A, while performing high-brightness light emission upon setting the driving duty of LED1 to ⅔ in accordance with the sequence shown in FIG. 18.

Hence, according to the above-mentioned embodiment, the LED light emission time can be prolonged for a specific LED so as to improve the light emission brightness of the LED. This allows, for example, alarm display with a high brightness by a specific LED, depending on the state of the printing unit in the MFP apparatus. For example, the light emission brightness of one LED can be changed to a low brightness in accordance with the control sequence shown in FIG. 17A if the replacement of the ink tank is desirable, and to a high brightness in accordance with the control sequence shown in FIG. 18 if the replacement of the ink tank is urgent, as described in the details in the background of this specification.

[Eighth Embodiment]

An example of an electric device with a configuration which executes turn on control of four LEDs, and key input control of two switches will be described. Note that the configuration of the electric device according to this embodiment is the same as that shown in FIG. 6, and a description thereof will not be given.

FIG. 19 is a table showing a control sequence.

The control sequence shown in FIG. 19 is obtained by adding turn on/off control of LED3 to that according to the seventh embodiment shown in FIG. 18. Then, as shown in FIG. 19, state4 is added to the control sequence shown in FIG. 18 as the fourth state, and LED0 and LED3 are simultaneously controlled in state4.

This allows turn on control of two LEDs (LED0 and LED1) in two time zones in the control periods of state1 to state4. This makes it possible to improve the light emission brightnesses of LED0 and LED1, as described in the seventh embodiment. However, in this case, the light emission brightnesses of LED2 and LED3 become lower than those of LED0 and LED1.

FIG. 20 is a table showing a control sequence when finer LED control is performed in accordance with the eighth embodiment. Execution of such a control sequence solves the problem that the light emission brightnesses of LED2 and LED3 lower.

As can be seen from a comparison between FIGS. 20 and 19, the control sequence shown in FIG. 20 is obtained by adding an almost equivalent control sequence after state4 shown in FIG. 19 to newly provide four states: state5 to state8.

Referring to FIG. 20, state1 to state4 are the same as in FIG. 19, and state5 and state6 are a repetition of state1 and state2, while state7 and state8 have the following differences from state3 and state4. That is, LED3 is controlled in state7 while turn on/off control of LED1 serving as an added controlled target is performed in state3. LED2 is controlled in state8 while turn on/off control of LED0 serving as an added controlled target is performed in state4. A method of key press detection in state5 to state8 is the same as in state1 to state4, respectively.

This allows turn on control of sets of two LEDs in four time zones (state3, state4, state7, and state8) in the control periods of state1 to state8.

In other words, in the control periods of state1 to state8, the driving duties of all of LED0 to LED3 are changed to ⅜ to perform control so as to equalize the light emission times of LED0 to LED3 while prolonging the light emission times of LED0 to LED3. This makes the control period longer than that in the control sequence shown in FIG. 19, but achieves more uniform light emission brightnesses.

Hence, according to the above-mentioned embodiment, since all LEDs can be controlled to increase their light emission times, the light emission brightnesses of all LEDs can be uniformed without lowering the light emission brightnesses of some LEDs.

Figure 21:
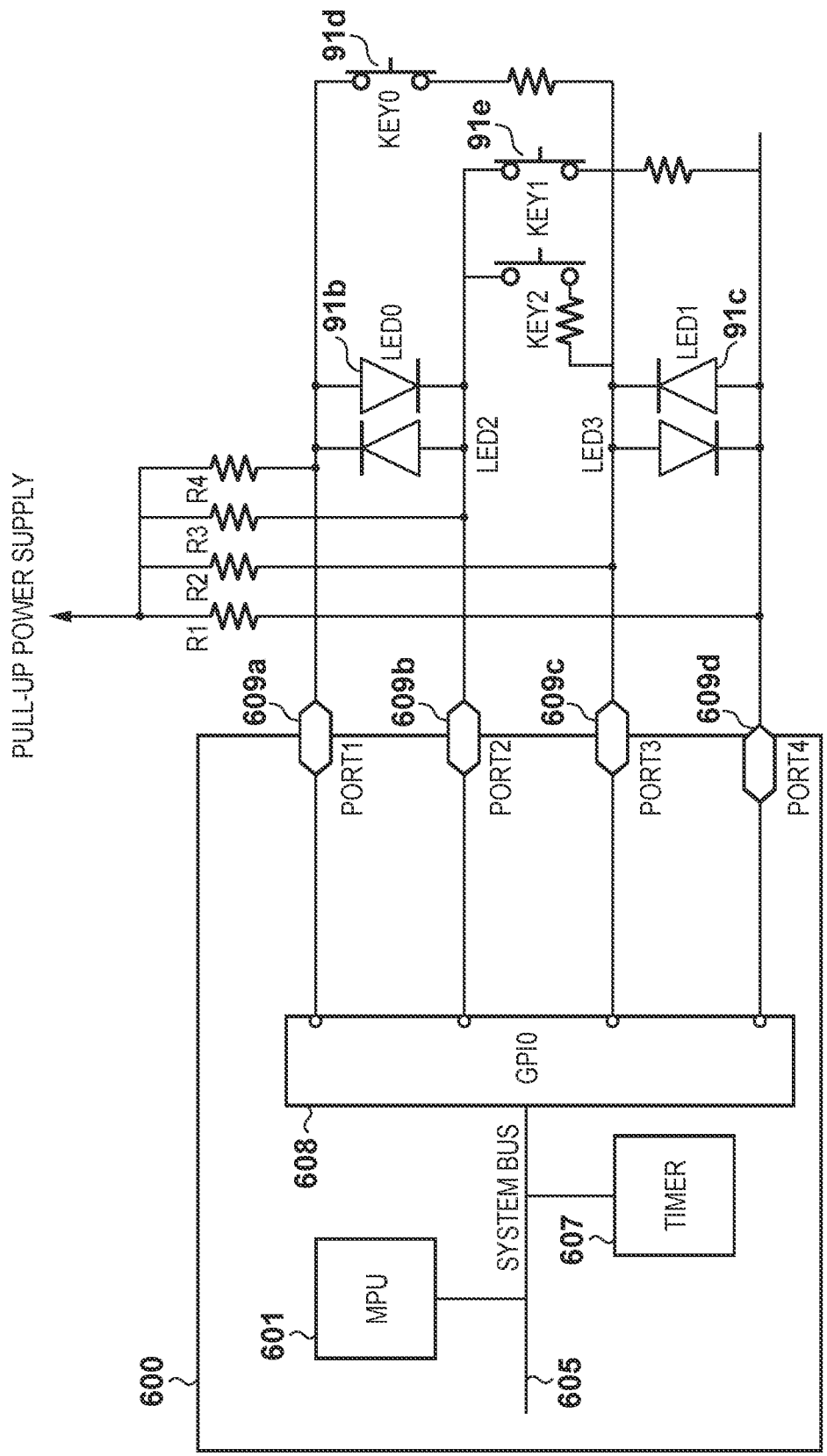
FIG. 21 is a block diagram showing the configuration of an electric device according to the nineth embodiment.

In addition the above described first to eight embodiments, another embodiment is possible. FIG. 21 shows a block diagram showing the configuration of an electric device according to the nineth embodiment. In this arrangement, the electric device executes turn on control of four LEDs and key input control of three switches. More specifically, the electric device time-divisionally switches over the states of the general purpose input and output ports (PORT1, PORT2, PORT3, and PORT4). Although an electric device used in an operation unit of an MFP apparatus has been described in each of the above-mentioned first to ninth embodiments, it is used not only for an MFP apparatus but also for other apparatuses such as a digital camera, a scanner, and a standalone inkjet printer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-147599 and 2012-147600, filed Jun. 29, 2012, which are hereby incorporated by reference herein in their entirety.

What is claimed is:

1. An electric device which performs turn on/off control of a plurality of light emitting elements, and key press detection of a plurality of switches, the device comprising:

a plurality of general purpose input/output ports configured to output driving signals to the plurality of light emitting elements, and input signals indicating key press from the plurality of switches; and a control unit configured to time-divisionally perform the turn on/off control of the plurality of light emitting elements and control of the key press detection of the plurality of switches by periodically repeating a predetermined number of time zones, whose number is equal to/more than a number of the light emitting elements, and switching between an input state and output state of each of the plurality of general purpose input/output ports in unit of the single time zone, wherein the plurality of light emitting elements include at least a first light emitting element and a second light emitting element, the plurality of switches include at least a first switch, and the predetermined number of time zones includes a time zone during which control of turn on/off of both the first light emitting elements and the second light emitting element are performed, and another time zone during which control of turn on/off of the first light emitting element and control of key press detection the first switch are performed.

2. The device according to claim 1, wherein the control unit controls such that each of the plurality of light emitting elements are turned on/off in each of different time zones.

3. The device according to claim 1, wherein the plurality of light-emitting elements further includes a third light emitting elements, and the predetermined number of time zones includes still another time zone during which control of turn on/off of both the second light emitting elements and the third light emitting element is performed.

4. The device according to claim 1, wherein one of the plurality of light emitting elements and one of the plurality of switches are connected to each of the plurality of general purpose input/output ports.

5. The device according to claim 1, wherein each of a plurality of general purpose input/output ports is settable to be in a high-level state, low-level state, or high-impedance state as a signal state.

6. The device according to claim 1, wherein the plurality of light emitting elements include any of LEDs, laser diodes, electroluminescence (EL) elements, and organic EL elements.

7. A printing apparatus using an electric device according to claim 1 as an operation unit.

8. The device according to claim 1, wherein the first light emitting element, the second light emitting element, and the first switch are connected to the plurality of general purpose input/output ports.

9. The device according to claim 1, wherein the input state and the output state of the plurality of general purpose input/output ports are in a high-level state, low-level state, or high-impedance state, respectively.

* * * * *